United States Patent [19]

Henderson et al.

[11] 4,171,241
[45] Oct. 16, 1979

[54] DISPENSERS FOR THIN FLAT RIGID ARTICLES

[75] Inventors: Kenneth J. Henderson, Crowthorne; Alan J. Gordon, Liverpool, both of England

[73] Assignee: Shandon Southern Products Limited, Cheshire, England

[21] Appl. No.: 883,466

[22] Filed: Mar. 6, 1978

[30] Foreign Application Priority Data

Mar. 4, 1977 [GB] United Kingdom ............... 9342/77

[51] Int. Cl.² .......................... B29C 27/08; B31B 1/64
[52] U.S. Cl. .................................. 156/556; 156/572; 156/578; 221/209; 221/255; 221/270
[58] Field of Search ............... 156/538, 539, 556, 570, 156/572, 578; 221/209, 255, 260, 270; 350/92

[56] References Cited

U.S. PATENT DOCUMENTS

| 309,715 | 12/1884 | Harper | 221/255 |
|---|---|---|---|
| 1,434,061 | 10/1922 | Lewis | 221/270 |
| 2,635,026 | 4/1953 | Kreul | 221/255 |
| 2,707,066 | 4/1955 | Stegeman | 221/255 |
| 3,215,151 | 11/1965 | Heim et al. | 221/255 |
| 3,480,504 | 11/1969 | Good et al. | 156/556 |
| 3,833,449 | 9/1974 | Johnson | 156/556 |
| 3,930,928 | 1/1976 | Tapert | 156/556 |

FOREIGN PATENT DOCUMENTS 796157 6/1958 United Kingdom .

Primary Examiner—Michael G. Wityshyn
Attorney, Agent, or Firm—Kurt Kelman

[57] ABSTRACT

A dispenser for thin flat rigid articles such as glass cover slips for microscope slides comprises a magazine for a stack of such articles and a dispensing block carrying the magazine and reciprocable relative to a spring blade running in a groove in the top of the block and under the magazine. The depth of the grooves changes so that the front of the blade rises as it travels in the groove, under the magazine, from a projection less than the thickness of article to a projection greater than that thickness, so as to engage and push only the lowermost article under a resilient barrier that restrains other articles in the stack.

Also disclosed is an automatic microscope slide coverslipping machine incorporating the dispenser.

8 Claims, 11 Drawing Figures

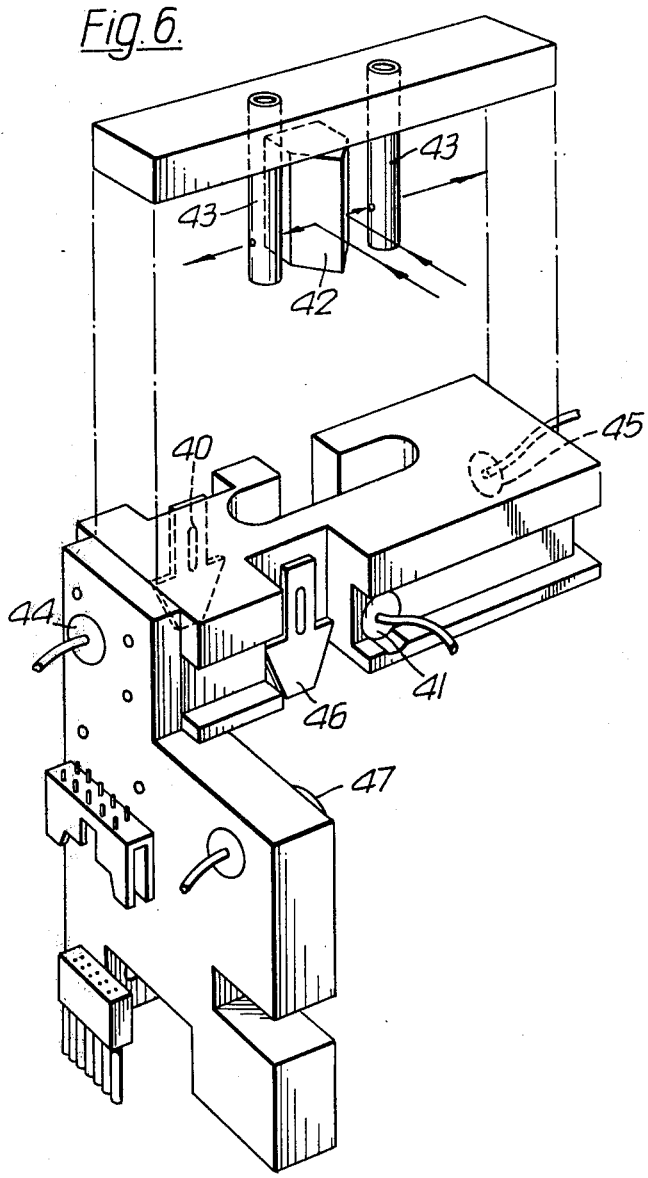

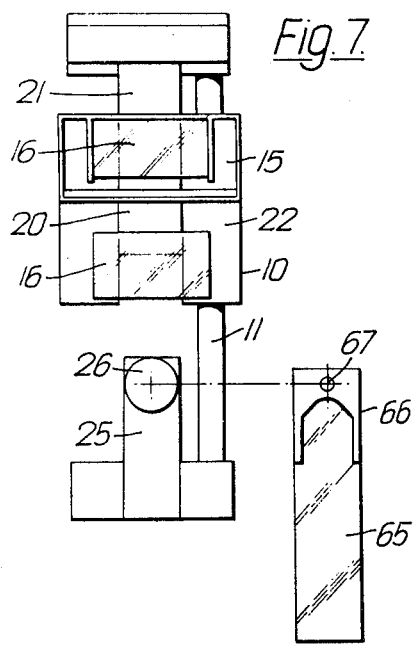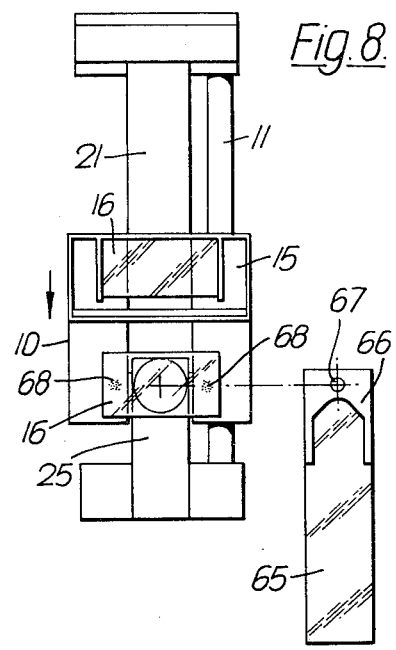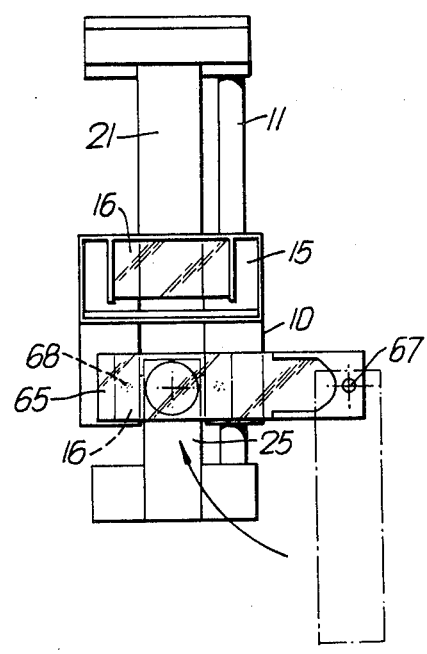

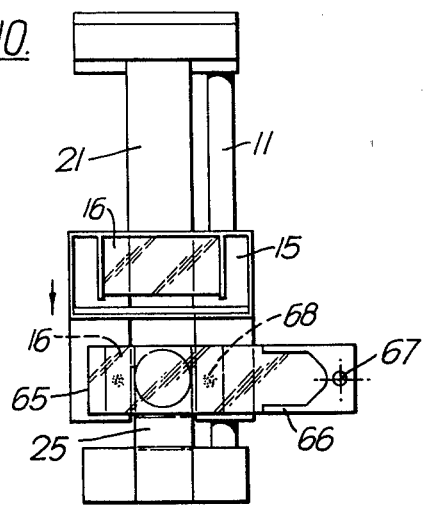
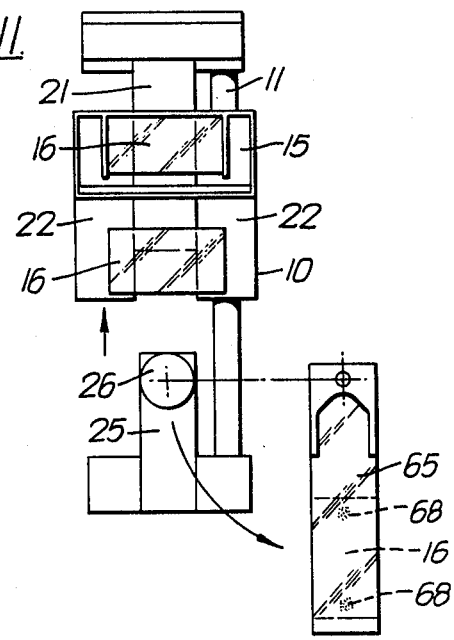

DISPENSERS FOR THIN FLAT RIGID ARTICLES

FIELD OF THE INVENTION

The invention concerns the dispensing of thin flat rigid articles of uniform and common nominal thickness such as microscope slide cover slips from a stack thereof so as to facilitate their manipulation or utilization.

Microscope slide cover slips are thin and fragile and have relatively accurately plane polished surfaces so that when stacked together they tend to adhere one to the next and present difficulties in their separation. Separation can only reliably be accomplished by sliding one over its immediate neighbour, but this in practice is not easy to accomplish because groups of the slips tend to slide as packs from an end of a stack of such slips and the extraction of a single slip from such a pack requires care and dexterity. In a busy laboratory or the like, where large numbers of cover slips have to be routinely applied to microscope slides, this operation represents a not insignificant proportion of the total workload of the technicians.

THE INVENTION

A dispenser for thin flat rigid articles of uniform and common nominal thickness comprises a magazine for receiving a stack of such articles with their planes substantially horizontal; a dispensing block fixed with respect to the magazine and positioned to support such a stack of said articles in said magazine by engaging part of the lower face of the lowermost article of said stack, said dispensing block including a channel disposed to extend beneath the lower face of said lowermost article and decreasing in depth in a dispensing direction; a flexible dispensing blade extending generally in said dispensing direction and having one end resting in the deeper end of said channel, the dispensing block and dispensing blade being adapted for relative reciprocating movement parallel with said dispensing direction and the arrangement being such that upon relative movement of the blade and block towards each other the leading end of the blade engages the trailing edge of said lowermost article of said stack and effects displacement thereof in the dispensing direction relative to the remainder of said stack, the thickness of the blade and the configuration of the said channel being so related that in the relative positions of the blade and block in which the leading end of the blade first contacts the trailing edge of the lowermost stack article it stands proud of the block surface supporting the article by a distance less than the nominal thickness of the article; and resilient barrier means for restraining movement, in the said dispensing direction, of articles in said stack other than said lowermost article.

As noted, the arrangement of the dispensing blade in the dispensing block channel is such that when the dispensing blade and dispensing block are in the relative positions thereof in which the leading end of the dispensing blade first engages the trailing edge of the lowermost article in the stack, the blade projects above the block surface, on which the lowermost article rests, by a distance less than the nominal thickness of the article: accordingly, the blade can engage only the lowermost article to displace this relatively to the next lowermost article in the stack. However, because of the decreasing depth of the channel in which the blade moves during that part of the relative movement of the blade and block in which movement of the lowermost article in the dispensing direction is caused to occur, the blade rises relatively to the article to provide an increasing area of engagement with the trailing edge thereof to ensure that the article is positively advanced and to minimise the risk of the article riding up and over the blade.

Preferably the thickness of the blade and the configuration of the said channel are such that in causing movement of the lowermost article in the dispensing direction, the upper surface of the blade rises to a level substantially above that of the article being moved in the dispensing direction, whereby the remaining articles in the stack are lifted. Such lifting has a twofold effect: adhesion between the next lowermost article in the stack and that being dispensed is broken by separation of the previously engaged surfaces of those articles; and secondly, the next lowermost article is raised to a position such that it is incapable of negotiating the resilient barrier means under which the article being dispensed is passing. Thus, any tendency for adhesion between articles in the stack to cause a superposed article to follow the movement of the one therebelow whilst that is being dispensed as a result of the relative movement of the dispensing block and dispensing blade is overcome, so that the articles are reliably dispensed singly and in succession. This is especially important in the case of a dispenser intended for dispensing microscope slide cover slips that, as has been explained, by their nature tend to be difficult to separate.

Although the arrangement may be such that the magazine and dispensing block are fixed in position and the dispensing blade moves to dispense articles from a stack thereof in the magazine by pushing such articles successively under said barrier means and on to a suitably positioned receiving surface, it is preferred that the dispensing blade be fixed and the magazine and dispensing block perform a reciprocating movement relatively thereto.

Depending upon requirements, the receiving surface may be arranged for movement in various senses to effect the required movements of the articles dispensed successively thereonto. For instance, the receiving surface might be constituted by a conveyor, such as a belt conveyor, adapted to transport dispensed articles successively and continuously or intermittently to a station of use.

However, in preferred embodiments of the invention in which the dispensing block reciprocates relatively to a fixed dispensing blade, the receiving surface is constituted by an upper surface portion of the dispensing block, and the movement of the block is utilised to convey a dispensed article to a platform adapted for limited upward motion to lift a dispensed article thereon to a higher level in the performance of a subsequent operation involving the article. Specifically, when the dispensed articles are microscope slide cover slips, such upward movement of a dispensed slip on said platform is conveniently utilised to bring that slip into engagement with a microscope slide positioned thereabove at a mounting station.

Thus, in the case of a dispenser intended for dispensing microscope slide cover slips, the dispenser is conveniently integrated with a machine for applying the dispensed slips automatically and successively to a succession of microscope slides fed to a mounting station, the dispensing movements of the dispenser components being co-ordinated with those of mechanisms for applying mountant to each dispensed slip, for positioning a microscope slide (bearing a specimen on its lower surface) over the mountant-bearing cover slip, and for raising the slip into contact with the slide and specimen thereon to affix the cover slip in protective relationship to the specimen.

THE DRAWINGS

The drawings illustrate an automatic microscope slide coverslipping machine incorporating a cover slip dispenser embodying the invention. In these drawings:

FIG. 6 is an exploded perspective view of arrangements for detecting the dispensing of mountant fluid drops; and FIGS. 7 to 11 are diagrams illustrating successive stages in the operation of the machine in dispensing a cover slip and affixing the latter to a microscope slide.

DESCRIPTION OF PREFERRED EMBODIMENT

Figure 1:
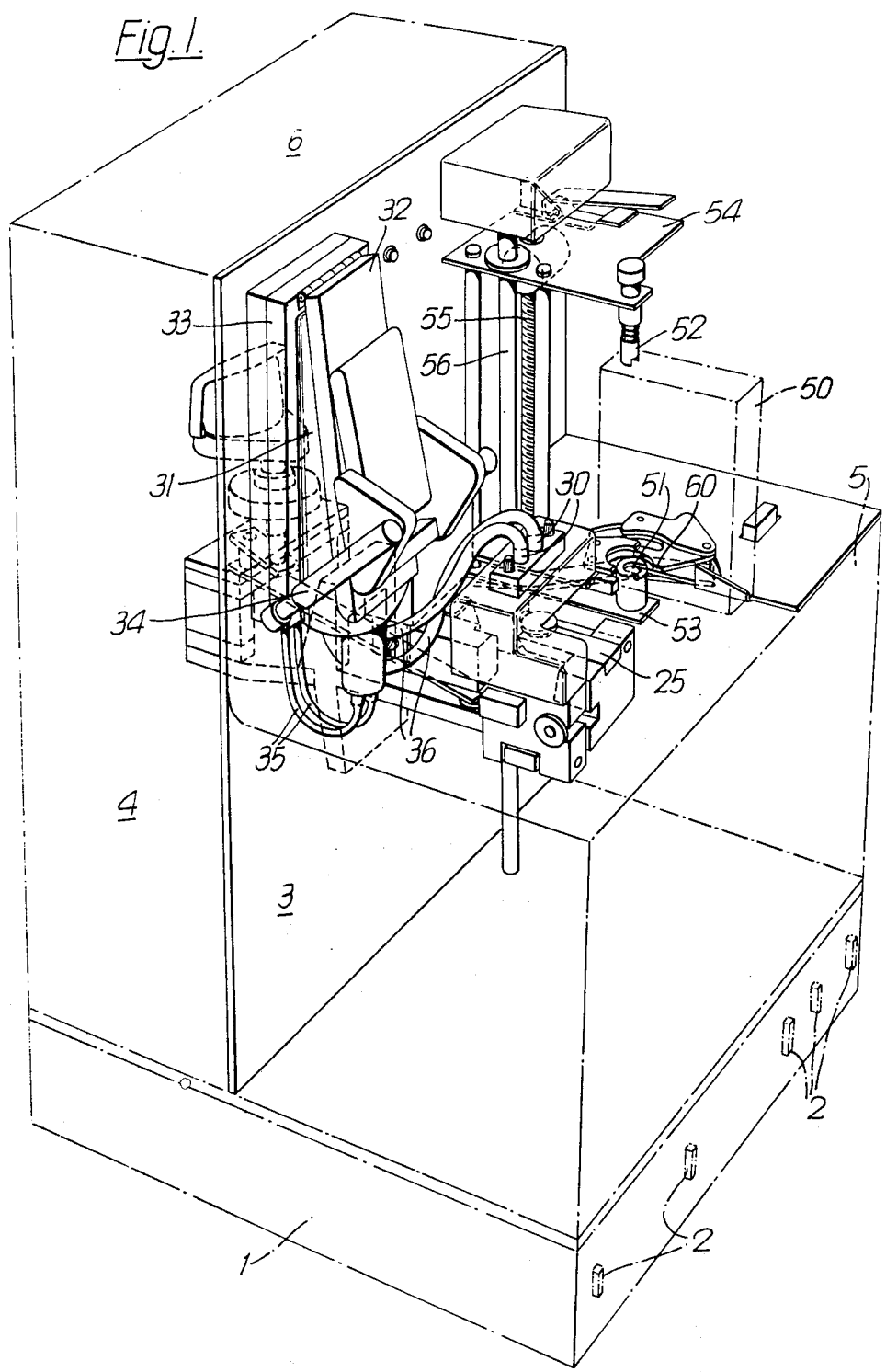
FIG. 1 is a perspective view of the machine, showing the general organisation thereof.

The machine illustrated in FIG. 1 is adapted to effect automatic coverslipping of a set of microscope slides and for this purpose includes various sub-assemblies and units adapted to handle the slide set and to present each slide in turn at a cover slip mounting station; to dispense and convey cover slips sequentially to said mounting station; to apply mountant in an appropriate amount to each cover slip at the mounting station; to bring each mountant bearing cover slip into engagement with a slide at the mounting station in a manner to cause fixation of the slip to the slide; and to effect curing of the mountant to render permanent the fixation of the slips to the respective slides of the set.

The machine comprises a base unit 1 that houses control equipment (not shown) for causing appropriately coordinated operation of the various sub-assemblies and units, this control equipment comprising, conveniently, a microprocessor with appropriate logic adapted to achieve interlocked sequences of component operations by receiving position-significant signals from sensors detecting the completion of individual operations of machine components, as will be described in detail. The base 1 is equipped with various switches and annunciators, as indicated diagrammatically at 2.

Figure 2:
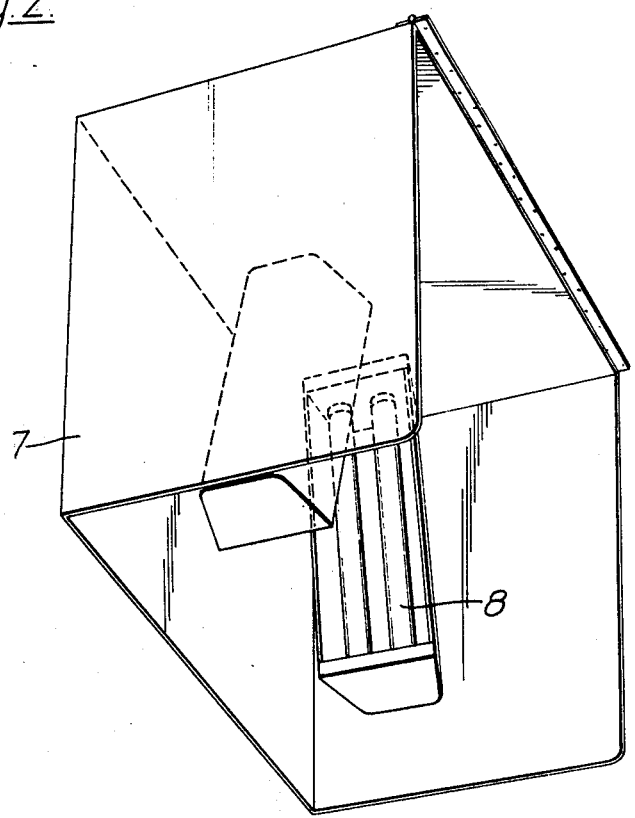
FIG. 2 is a rear perspective view of the (detached) cover of the machine of FIG. 1, showing UV light emitters for curing the mountant of coverslipped slides.

The base 1 carries a vertical plate 3 that serves as a mount for certain of the sub-assemblies, as will be described. The base 1 and the plate 3 also carry side panels 4, a front panel 5, a rear panel and a top panel 6 together constituting a housing that encloses much of the mechanism. Along its top edge, the plate 3 is hinged to cover 7, shown detached in FIG. 2 and omitted from FIG. 1 for clarity, that when swung down encloses the remainder of the mechanism and positions UV light sources 8 appropriately for irradicating the set of slides after coverslipping thereof.

Figure 3:
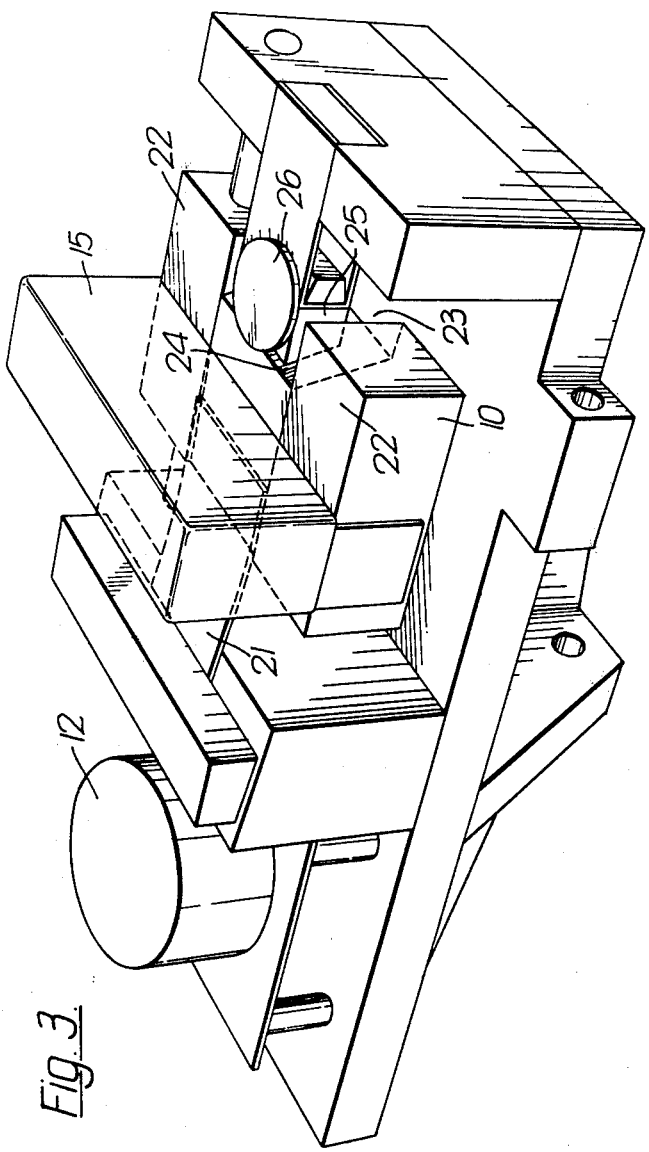
FIG. 3 is a partly diagrammatic rear three quarter perspective view of the cover slip dispenser embodied in the machine of FIG. 1.
Figure 4:
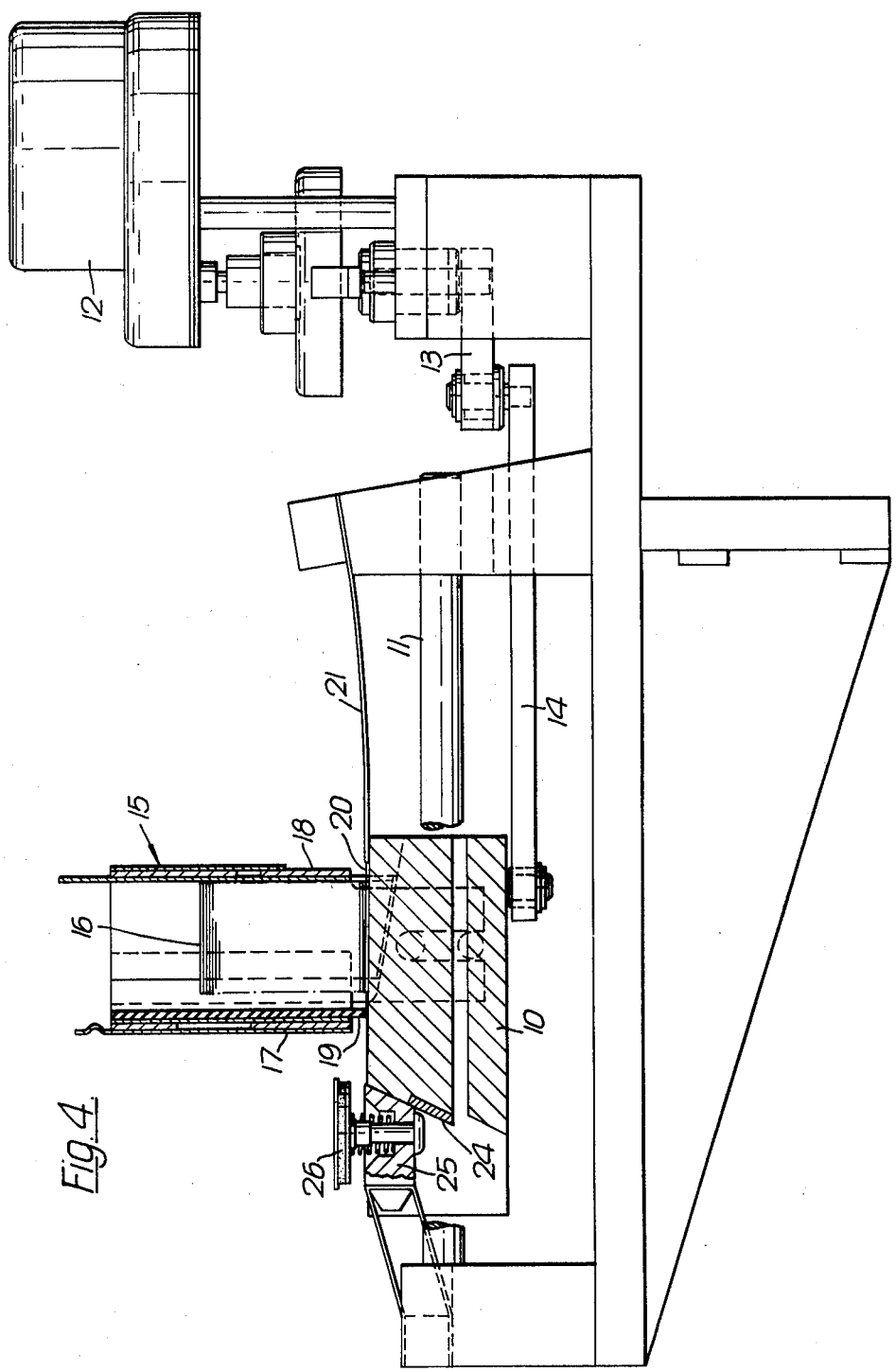
FIG. 4 is a part-sectional front elevation of the dispenser of FIG. 3, showing the parts thereof at the commencement of a dispensing operation.

The machine of FIG. 1 is characterised by a sub-assembly constituting a dispenser for microscope slide cover slips. This sub-assembly best illustrated in FIGS. 3 to 5, comprises a dispensing block 10 supported for rectilinear reciprocating movement on a pair of parallel slide rails 11 (one omitted for clarity in FIG. 3) by means of an electric motor 12 with a crank 13 and link 14 connection to the dispensing block 10. The dispensing block 10 carries a magazine 15 that extends vertically above the block and is dimensioned to receive a stack of microscope slide cover slips 16. The magazine has suitable internal fitments (not shown) for supporting the stack of cover slips and for applying a suitable download on the stack to ensure downwards progression of the stack as cover slips are dispensed from the bottom thereof by the operation of the dispenser as will be described.

The magazine 15 is fixed to the dispensing block so that at least its front and rear walls 17, 18, respectively, considering the motion of the block on the slide rails 11, are clear of the upper surface of the block 10 by a distance related to the thickness of the cover slips 16 to be dispensed. The magazine is conveniently a sheet metal fabrication and the lower edge of its front wall 17 is fitted with a rubber moulding 19 that occupies the clearance space between the lower edge of the wall 17 and the upper surface of the dispenser block 10 to constitute a flexible and resilient barrier effective to restrain the passage of cover slips 16 adhering to the upper surface of a lowermost slip of the stack when that slip is being dispensed as hereinafter described.

The upper surface of the dispensing block 10 is formed with a channel 20 of a width less than that of the cover slips 16 to be dispensed and having a depth that decreases from the rear to the front of the dispensing block. When a stack of cover slips 16 is received in the magazine 15, the lowermost slip of the stack has its lateral margins supported by the upper surface of the dispensing block on either side of the channel 20.

A thin spring steel dispensing blade 21 is clamped in fixed position generally in alignment with the direction of reciprocation of the dispensing block 10, the blade 21 being fixed at its rear end and having its front end received in the channel 20 in the dispensing block. The blade width corresponds with the channel width and its thickness is about four times the nominal thickness of the cover slips 16 to be dispensed: that is to say, in the case of a dispenser intended to dispense cover slips 16 of the standard 22×40 mm size with a nominal thickness of 0.165 mm, the thickness of the dispensing blade 21 will preferably be approximately 0.66 mm.

The forward end of the dispensing block 10 is bifurcated to provide a receiving surface 22 having a central slot 23. The front face 24 of the block within the said slot is ramped to engage a correspondingly ramped lifting platform 25 with a resilient pressure pad 26 at a mounting station at the forward limit of travel of the dispensing block 10.

The machine further includes, at the mounting station and at a level above the path of the upper surface of the dispensing block 10, a mountant applicator comprising a pair of nozzles 30 through which a suitable cover slip mountant fluid may be discharged, dropwise, from a flexible container 31 by means of a fluid dispensing mechanism of the construction described in the copending Application of Alan J. Gordon filed concurrently herewith and that includes pressure plates 32, 33 urged by spring links 34 to squeeze the container 31 to express mountant to the nozzle 30 through conduits 35 and 36 under the control of solenoid-actuated valves (not shown) at appropriate instants in the cycle of operation of the machine, as will be described. The mountant applicator includes the structure shown in FIG. 6 that includes a sensing device (reflective read head—a combination of LED and phototransistor) 40 for photoelectrically sensing the presence of a cover slip in position at the mounting station to receive discharged mountant; a mountant drop detector system comprising an LED 41, a beam splitter/diverter prism 42 for directing light from LED 41 through paths intercepting guide tubes 43 through which mountant drops fall from the nozzles 30, and, phototransistors 44, 45; a sensing device (reflective read head) 46 for sensing the presence of a microscope slide at the mounting station; a platform lift sensing system comprising a phototransistor 47 receiving light from a LED (not shown) positioned opposite thereto; and a dependent slide support boss (not shown).

The machine further includes, adjacent to the mounting station, a mechanism for transporting microscope slides successively to the mounting station for the mounting of cover slips on such slides. In the particular machine being described, this mechanism is adapted for handling microscope slides carried in sets by slide-holding clips supported on a metal rod having one end fitted with a button. Such a set of slides is represented by the rectangle 50 in FIG. 1. The slide transporting mechanism of the machine comprises a lower socket 51 adapted to receive the button on the end of the rod carrying the slide set 50, and an upper socket 52 adapted to receive the other end of the rod so that the rod is held vertically and the microscope slides extend horizontally and generally radially on the rod. The arrangement of the microscope slides in their clips on such a rod is such that the specimens carried by the slides and intended to be covered by the cover slips are on the lower faces of the respective slides when the set of slides is supported by the sockets 51, 52 of the slide transporting mechanism of the machine.

The sockets 51, 52 of the slide transporting mechanism are carried by arms 53, 54 associated with a vertical leadscrew device 55 that is indexed by a motor (not shown) to raise and lower the arms 53, 54 and the sockets 51, 52 and, thus, a set 50 of slides carried thereby on a vertical guide 56. The arms 53, 54, at the lowest point of their respective permitted travel, extend into a chamber within the machine housing of generally rectangular plan section and of a size slightly larger than the plan section of a set of slides to be carried by the sockets, so that when a set of slides is fitted to the slide transport mechanism it may be lowered into the said chamber to protect the slides and uncovered specimens thereon from contamination. If the machine is to be used for coverslipping slides bearing histological or like specimens that have been wax-impregnated after dehydration and clearing by the usual procedures for treating such specimens, the chamber walls are lined with absorbent material such as filter paper and in operation of the machine a small quantity of solvent such as xylène, for instance, is placed in the chamber so that the atmosphere therein will be saturated with the vapour of that solvent to protect the specimens on the slides against drying-out. The top of the chamber is just below the level of the mounting station.

The slide transporting mechanism further comprises an indexing mechanism including a pair of fingers 60 adapted to engage the slide-holding clip of a slide that, by action of the leadscrew device 55, has been brought to the level of the mounting station. The indexing mechanism includes an actuator for moving the fingers 60 about an arc centred on the axis of the sockets 51, 52 and thus of the rod carrying the slide-holding clips of a set of slides supported by the sockets so that when engaged with a slide-holding clip at the level of the mounting station the motion of the fingers 60 caused by operation of the actuator pivots the engaged clip and slide held thereby through an angle of about 90° to position the slide directly over the lifting platform 25 and with its upper surface lightly engaged with the said dependent slide support boss, for coverslipping.

The actuator of the indexing mechanism is operated by an electric motor and a crank and link connection and for control purposes the drive for the crank includes a spindle having cutouts that in appropriate positions of the spindle align with the optical axis of a photoelectric sensing device, the arrangement of the cutouts being such that when one is aligned with the sensing device the actuator is in the appropriate position for the said fingers to engage a slide-holding clip when brought out of said chamber to the level of the mounting station, whereas the other cutout is aligned when the fingers 60 have been moved by the amount required to swing the engaged clip and slide held thereby into position for coverslipping at the mounting station.

Figure 5:
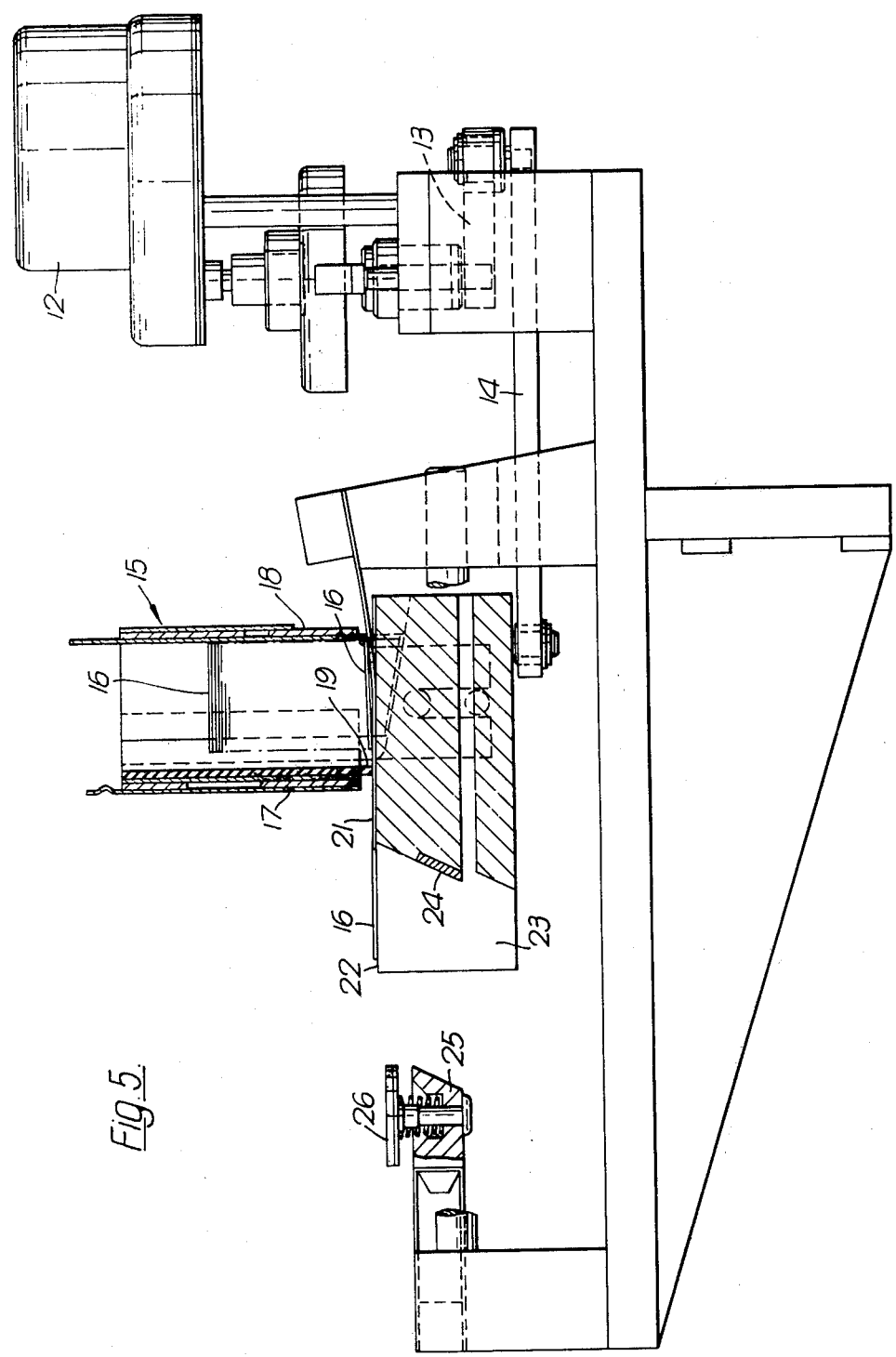
FIG. 5 is a view corresponding to FIG. 4 but showing the parts at the conclusion of a dispensing operation.

The operation of the machine generally comprises the initial step of dispensing a cover slip 16, from the magazine 15, on to the receiving surface 22 of the dispensing block 10 while the latter is moving rearwardly towards the position shown in FIG. 5 from its (forward) stroke end position (FIG. 4) nearest to the mounting station, this movement of the dispensing block 10 normally occurring at the conclusion of a coverslipping cycle of operation of the machine.

At the commencement of coverslipping cycle, the dispensing block 10 moves forwardly, i.e. in the dispensing direction, until its arrival near to its forward stroke end position is signalled by detection of the presence of a cover slip 16 on the receiving surface 22 by the photoelectric sensing device 40 of the mountant applicator. The motion of the dispensing block 10 is arrested and the mountant applicator caused to discharge a drop of mountant from each nozzle 30 thereof. When a drop of mountant is discharged from a nozzle 30, the drop falls down the associated guide tube 43 interrupting the beam from the LED 41 to the relevant phototransistor 44 or 45 that produces a signal for the control system: a signal from each phototransistor 44, 45 is required to trigger operation of the leadscrew device 55 to bring the topmost slide in the said chamber up to the level of the mounting station, whereafter the indexing mechanism is operated to cause that slide to be swung into position for coverslipping, over the mountant-bearing cover slip 16 and beneath the said slide support boss. Thereafter the dispensing block 10 is caused to complete its forward movement to its stroke end position (FIG. 4), so that the ramped surface 24 of the front end of the block 10 and the complementary surface of the front end of the lifting platform 25 cause the latter to move upwardly to lift the cover slip 16 into engagement with the slide and specimen thereon, the upthrust of the lifting platform 25 being reacted by the said support boss engaging the upper surface of the slide so as to enable sufficient pressure to be developed to fix the cover slip securely to the slide.

The coordination of the motions of the machine components, as just described, is illustrated by FIGS. 7 to 11. Thus FIG. 7 shows the dispenser block 10 in its most rearward (FIG. 5) position with a cover slip 16 on the receiving surface 22. The topmost microscope slide of the set within the said protective chamber is shown at 65, carried in a clip 66 pivotable on its carrying rod (not shown) the axis of which is shown at 67.

FIG. 8 shows the parts after the block 10 has been arrested and the mountant applicator has operated to apply drops of mountant fluid to the areas 68 near the ends of the cover slip 16. As shown, the cover slip is positioned over the pad 26 of the platform 25.

FIG. 9 shows how the slide 65 having been raised to the level of the mounting station, is swung over the cover slip by the operation of the indexing mechanism. The presence of the slide in this position is sensed by the device 46 (FIG. 6) and releases the control system to cause further forward movement of the block 10 to the position represented by FIG. 10, causing the platform 25 to lift the cover slip 16 into engagement with the slide 65, as explained.

FIG. 11 shows the block 10 returning to rearward (FIG. 5) position while the indexing mechanism returns the now coverslipped slide 65 to alignment with the other slides of the set 50. During this return movement of the block 10, another cover slip 16 is dispensed from the magazine 15 onto the receiving surface 22.

The various motions of the machine components are effected by electric motors as described, one motor driving the dispensing block 10 another the leadscrew device 55 and a third the indexing mechanism of the slide transport mechanism. Although the required sequence of operations of the respective drive motors could be controlled by a programming device or by mechanical switches such as limit switches sensing the positions of components in motion, the preferred control of the drive motors is by way of photoelectric sensors.

Thus as has been described, the forward motion of the dispensing block 10 towards the mounting station is arrested by detection of the arrival of a cover slip in position under the mountant applicator. The photoelectric sensing device 40 that triggers this arrest of the block-driving motor also activates the mountant dispensing system to cause drops of mountant to be discharged. The photoelectric devices 44, 45 sensing the falling of drops of mountant from the nozzles 30 not only close the control valves of the mountant dispensing system but also activate the driving motor for the leadscrew device 55 so as to cause the set 50 of slides to be raised within the chamber until a further photoelectric sensing device detects the arrival of a slide 65 at the level of the mounting station and disables the leadscrew driving motor.

This last-mentioned photoelectric sensing device also initiates operation of the drive motor for the indexing mechanism that operates until the photoelectric device associated with the spindle driving the crank of the indexing mechanism is re-energized to signal the arrival of the slide, at the mounting station, in position for coverslipping.

Concurrently with triggering arrest of the driving motor for the indexing mechanism, the latter sensing device reactivates the driving motor for the dispensing block 10 so that this completes its forward stroke, causing the lifting platform 25 to rise and affix the mountant-bearing cover slip to the slide thereabove. The dispensing block is held in its stroke end position (detected by the device 47) for a suitable period for the mountant to flow in the space between the cover slip and the slide, whereafter the dispensing block performs a return stroke, lowering the lifting platform 25 to its normal, rest, position and dispensing a further cover slip from the magazine on to the receiving surface of the dispensing block ready for the initiation of a further coverslipping cycle of operation. During the return stroke of the dispensing block, the motor of the indexing mechanism is again activated so as to cause the slide on which a cover slip has now been mounted to be returned into radial alignment with the rest of the set of slides.

The operating cycle may then automatically repeat.

We claim:

1. A machine for applying microscope slide cover slips successively to a succession of microscope slides, which comprises a dispenser for sequentially dispensing the cover slips, said dispenser including
   (a) a magazine for receiving a stack of the cover slips with their planes substantially horizontal;
   (b) a dispensing block fixed with respect to the magazine and positioned to support the stack of said cover slips in said magazine by engaging part of the lower face of the lowermost cover slip of said stack;
   (c) said dispensing block including a channel disposed to extend beneath the lower face of said lowermost cover slip and decreasing in depth in a dispensing direction;
   (d) a flexible dispensing blade extending generally in said dispensing direction and having one end resting in the deeper end of said channel;
   (e) the dispensing block and dispensing blade being adapted for relative reciprocating movement parallel with said dispensing direction, whereby relative movement of the blade and block towards each other causes the leading end of the blade to engage the trailing edge of said lowermost cover slip of said stack and effects displacement thereof in the dispensing direction relative to the remainder of said stack and onto a receiving surface;
   (f) the thickness of the blade and the configuration of the channel being so related that, in the relative positions of the blade and block in which the leading end of the blade first contacts the trailing edge of the lowermost cover slip, the blade leading end projects above the block surface supporting the cover slip by a distance less than the nominal thickness of the cover slip;
   (g) resilient barrier means for restraining movement, in the said dispensing direction, of cover slips in said stack other than said lowermost cover slip;
   (h) a mountant applicator for applying mountant to each dispensed cover slip;
   (i) means for feeding microscope slides successively to a mounting station in coordination with the motion of said dispensing block; and
   (j) means for bringing a mountant-bearing cover slip into engagement with a microscope slide at the mounting station to fix the cover slip to the slide.

2. The machine of claim 1 in which the thickness of the blade and the configuration of the said channel are such that in causing movement of the lowermost cover slip in the dispensing direction, the upper surface of the blade rises to a level substantially above that of the cover slip being moved in the dispensing direction, whereby the remaining cover slips in the stack are lifted.

3. The machine of claim 1 in which the dispensing blade is fixed and the magazine and dispensing block perform a reciprocating movement relatively thereto.

4. The machine of claim 3 in which said receiving surface is arranged for movement to convey cover slips successively dispensed thereonto.

5. The machine of claim 4 in which said receiving surface is constituted by an upper surface portion of the dispensing block.

6. The machine of claim 5 including a platform adapted for limited upward motion to lift a dispensed cover slip thereon to a higher level and into engagement with a microscope slide at said mounting station, movement of the dispensing block being adapted to convey successively dispensed cover slips from said receiving station to said platform.

7. The machine of claim 1, including means adjacent to said mounting station for supporting a set of microscope slides in superposed horizontal spaced apart parallel relation; means for raising said set to bring each slide thereof successively to the level of the mounting station; and means for moving a slide at said mounting station level horizontally into said mounting station for coverslipping thereat.

8. The machine of claim 1, wherein the mountant applicator is arranged to apply mountant to each dispensed cover slip on the receiving surface.

* * * * *